United States Patent

[11] 3,620,264

[72] Inventor Edward I. Klein
 Montreal, Quebec, Canada.
[21] Appl. No. 25,947
[22] Filed Apr. 6, 1970
[45] Patented Nov. 16, 1971
[73] Assignee V-Mark Automation Ltd.
 Montreal, Quebec, Canada

[54] METHOD AND APPARATUS FOR ADDING FLUID TO FLUID-CARRYING FILLERS
 13 Claims, 3 Drawing Figs.
[52] U.S. Cl. ..................................................... 141/1,
  53/239, 141/20.5, 141/281, 401/132
[51] Int. Cl. ......................................................... B65b 1/04,
  B65b 3/04
[50] Field of Search ............................................ 141/1, 110,
  2, 20.5, 164, 111, 281, 282; 53/36, 239; 401/132,
  133, 134

[56] References Cited
UNITED STATES PATENTS
3,126,874 3/1964 Exner ........................... 141/20.5

*Primary Examiner*—Houston S. Bell, Jr.
*Attorney*—Alan Swabey

ABSTRACT: In adding fluid to fluid-absorbing fillings, a filler is positioned in a bore of a member. Fluid containing means on top of the member are connected to the bore by an opening which is centrally located with respect to a filler in the bore so that fluid in the fluid containing means passes through the opening to be absorbed by the filler. A plurality of the members can be located on an indexing table and moved past a series of work stations. At the work stations, a filler is positioned in each member, fluid is added to the fluid containing means of each member, time is provided to allow each filler to absorb the fluid and the fillers are then removed from the members.

PATENTED NOV 16 1971     3,620,264
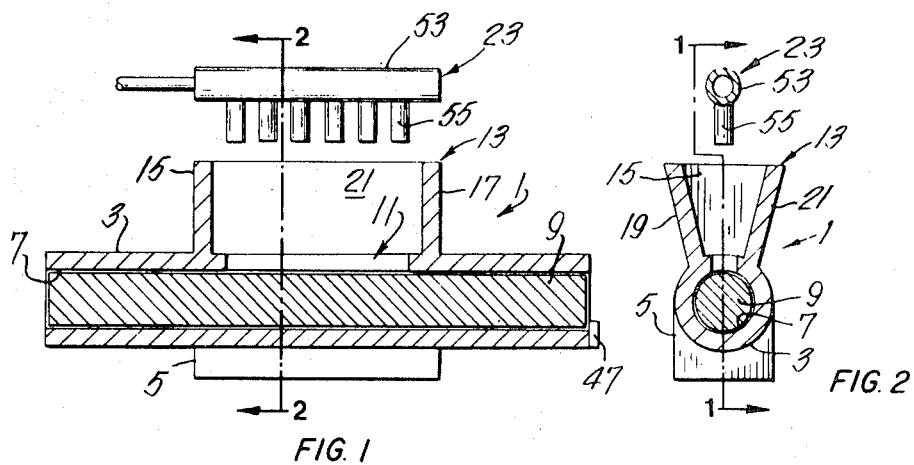
FIG. 1
FIG. 2
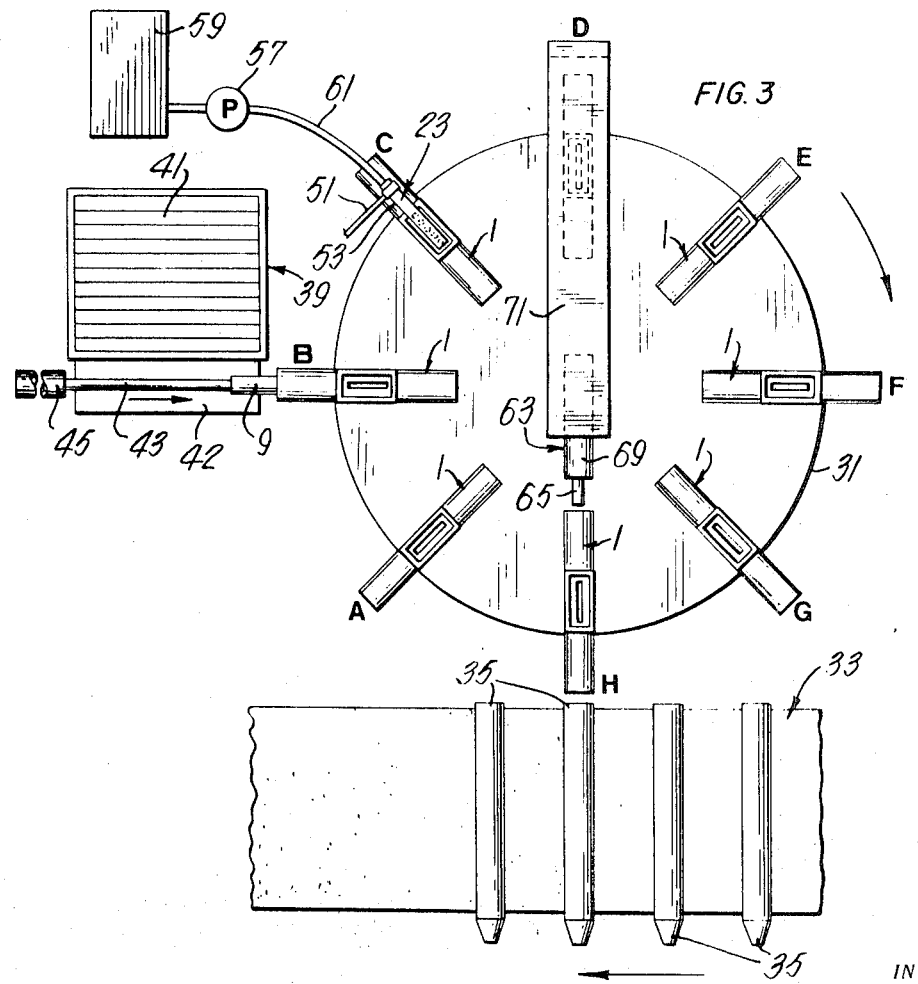
FIG. 3
INVENTOR
Edward I. KLEIN
Alan Swabey
ATTORNEY 3,620,264

METHOD AND APPARATUS FOR ADDING FLUID TO FLUID-CARRYING FILLERS

BACKGROUND OF INVENTION

1. Field of Invention

This invention relates to a method and apparatus for adding fluid to elongated absorbent, fluid-carrying fillers.

More particularly, the invention relates to a method and apparatus for adding ink to elongated absorbent, ink-carrying fillers, said inked fillers being used to provide an ink supply for marking pens.

Absorbent fillers are used to carry the ink supply for marking pens. Generally, the fillers comprise cylindrical rods of absorbent material, such as closely packed cotton fibers. Ink is added to the fillers and absorbed and the fillers are then inserted in the body of the pen to provide an ink supply to the writing nib of the marking pen.

2. Description of Prior Art

The present methods of adding ink to these fillers have disadvantages. In one method, a long thin needle is inserted into the filler from one end along the filler's longitudinal axis and the ink is injected into the body of the filler through the needle. The main disadvantage is the length of time required to inject the necessary amount of ink into the filler. The rate of injection cannot exceed the absorption rate of the filler. Thus, the apparatus can only work as fast, to add ink to the fillers, as the rate at which the ink can be absorbed. The insertion of the needle also creates a permanent hole in the filler into which ink gathers after the needle is withdrawn, thus affecting the even distribution of ink throughout the filler. Also, the tin needle is often bent during use, requiring frequent servicing.

Another method for adding ink to the fillers has been to soak a bundle of the fillers in a measured amount of ink until all the ink has been absorbed by the fillers. This method again has the disadvantage in the length of time required for the fillers to absorb the necessary amount of ink and the amount of handling of the fillers that is required to bundle and unbundle them. This method also has the disadvantage that the outer fillers in the bundle usually absorb more ink than the fillers at the center of the bundle. Thus, the fillers end up carrying different amounts of ink. The amount of ink supplied to the fillers can be important. The fillers should absorb between 83 percent and 87 percent, and preferably 85 percent, of the ink they are capable of absorbing. If more ink than 87 percent of the filler's capacity is absorbed, the loaded filler, when inserted in a pen, can leak. If less than 83 percent of its capacity is absorbed, the most efficient use of the filler is not obtained. The above-described method is also somewhat messy in handling the inked bundles.

SUMMARY OF INVENTION

The present invention is designed to provide a method and apparatus to overcome the disadvantages of the prior art while, at the same time, providing means for automatic high-speed filling of the fillers with ink.

While the invention will be particularly described with respect to the filling of fillers with ink, suitable for use in marking pens, the invention can be used for loading any type of filler with other types of fluids suitable for other applications.

The invention is particularly directed toward a method for adding fluid to an absorbent, rod-shaped filler comprising the following steps: outer, end portions of the filler are circumferentially covered and at least half the circumference of the remaining portion of the filler is covered leaving a central, uncovered surface section on the filler extending between the end portions; a predetermined amount of fluid is then supplied to the central, uncovered surface section of the filler while the uncovered section faces upwardly and the filler is positioned with its longitudinal axis horizontal; the filler is kept covered while the fluid is absorbed by the filler through the central section and is then uncovered.

The invention is further directed toward an apparatus for adding fluid to a rod-shaped, absorbent filler. The apparatus includes a member having a horizontal bore for receiving the filler. The member includes means above the bore for receiving a predetermined amount of fluid to be added to the filler when the filler is in the bore, connects the fluid receiving means with an upper portion of the bore.

BRIEF DESCRIPTION OF DRAWINGS

The invention will now be described in detail having reference to the accompanying drawings, wherein;

FIG. 1 is a detailed view in cross section taken along line I—I of FIG. 2, showing the basic filling unit;

FIG. 2 is a view in cross section taken along line II—II of FIG. 1, showing the filling unit; and FIG. 3 is a plan view of a preferred embodiment of the apparatus for adding ink to fillers incorporating a plurality of the filling units.

DESCRIPTION OF PREFERRED EMBODIMENTS

As shown in FIGS. 1 and 2, the filling unit 1, used to add ink to the filler, comprises an elongated, tubular section 3 connected to a base 5. The base 5 supports the tubular section horizontally. The tubular section has a through bore 7 for receiving a rod-shaped filler 9. The filler 9 usually is cylindrical so the bore is circular in cross section to receive the cylindrical filler 9. Preferably, the tubular section 3 is of the same length as the filler 9, although it can be longer than the filler. An ink inlet 11 is formed in the wall of the tubular section. The inlet 11 is centrally located with respect to the filler 9 when the filler is inserted in the bore of the tubular section. The inlet 11 preferably comprises an elongated narrow, substantially rectangular opening located in the top of the wall of the tubular section and extends parallel to the axis of the bore.

A well 13 is formed about the inlet 11 to hold a predetermined amount of ink which is to be added to the filler located in the bore, through the inlet 11. The well 13 comprises end walls 15, 17 and sidewalls 19, 21 connected to tubular section about the inlet 11. Means 23 are provided above the well 13 for filling it with ink.

The operation of the filling unit will now be described. A filler 9 is inserted into the bore 7 of the unit and is centrally located therein with respect to the inlet 11. In effect, as shown in FIG. 4, the tubular section 3 circumferentially covers outer end portions "A" and "B" of the filler 9 and also covers at least half the circumference of the remaining central portion "C" of the filler. Preferably, to obtain more uniform distribution during filling, the outer end portions "A" and "B" are equal length. A central surface section "D," defined by the edges of the tubular section defining the inlet 11, remains uncovered. The bore 7 is of substantially the same size as the filler 9. This permits the tubular section 3 to straighten out any curved or bent fillers inserted therein and thus ensures more uniform ink distribution in the fillers. Section "D" is centrally located with respect to the ends of the filler. If desired, the ends of the filler could also be covered. The well 13 is then filled with ink. The ink drains down through the inlet 11 by gravity from the well to be absorbed by the filler first at its central portion closest to the inlet and moves in both directions away from the inlet through the filler to its ends so that the ink is uniformly distributed throughout the length of the filler. The filler is maintained within the bore of the unit until all the ink from the well has been absorbed and then is removed from the unit for insertion into a marker pen.

The area of the inlet 11 or conversely the area of uncovered surface section "D" is not too critical if unlimited time is available to permit the ink to be absorbed throughout the filler. The rate at which the ink is absorbed is dependent both on the area of inlet (and thus on the amount of surface area "D" of the filler exposed to the ink) and on the rate of absorption of the filler. The area of the inlet can be enlarged if the ink is to be absorbed by the filler within a relatively short period of time. The inlet 11 can have a length of up to 80 percent the length of the filler and a width equal to the width of the filler. Preferably, however, the width of the inlet is less than the width of the filler. If the length and/or width are greater than these figures, the ink could leak out from the ends of the filler resulting in waste and/or nonuniform distribution of ink within the filler could occur. By way of example, only, for filling a ¼-inch-diameter filler, 4 inches long, the inlet has a length of 3 inches and a width of seven thirty-seconds of an inch.

The filling unit 1 described is particularly suitable for use in assembling marker pens at high speed. As more clearly shown in FIG. 3, a plurality of the filling units 1, shown in FIG. 1, are arranged at equally spaced apart locations in a circle on a horizontal indexing table 31. The filling units extend in a radial direction from the center of the indexing table and can be detachably connected to the table by suitable means on their base. The indexing table 31 is located adjacent a step conveying means 33 carrying the shells 35 of the marker pens into which the fillers are to be inserted. The conveying means 33 can be of any known type but a preferred conveying means is a walking beam type, as shown in my U.S. Pat. application, Ser. No. 25,792, filed Apr. 6, 1970. The indexing table 31 rotates intermittently in steps about its central, vertical axis carrying each filling unit 1 in sequence past stations A, B, C, etc. Each step of the table moves a filling unit from one station to the next in sequence.

A loading station is located at station B. A filler 9 is inserted into the bore of each empty filling unit 1, which are indexed, by step movement of the table, opposite filler insertion means 39. A supply 41 of fillers is located at the loading station. Suitable means are provided for feeding a single filler at a time from the supply 41 to a positioning table 42 of the filler insertion means 39. On the table, the filler is aligned horizontally with the bore of the filling unit positioned at the loading station and a piston rod 43, actuated by a pneumatic or hydraulic cylinder 45, pushes the filler into the bore of the filler unit until the filler is centrally located with respect to the inlet 11 in the filling unit. A stop 47, as shown in FIG. 1, can be provided on the end of each filling unit closest to the center of the indexing table to assist in the positioning of the filler centrally within the holder with respect to the inlet 11.

The indexing table then moves clockwise, as viewed in FIG. 3, carrying the filling units to station C, which is an inking station. Here, ink is supplied to the well 13 of each filling unit. At the inking station, ink supply means 23, as shown in FIG. 1, are located over the well 13 to feed ink into it. The ink supply means comprises a hollow head 53 having one or more nozzles 55 extending down from the head. A plurality of nozzles extending substantially the length of the well 13 distributes the ink uniformly throughout the length of the well and thereby more rapid and uniform absorption of ink into the filler carried in the bore is obtained. The head 53 is detachable connected to the base (not shown) of the indexing table by an arm 51 and can be moved to various positions C, D, E, etc. about the periphery of the index table. The required amount of ink is supplied by means of a dispensing pump 57 from an ink supply 59 to the head 55, through a line 61. The dispensing pump can be of the type shown in my U.S. Pat. application, Ser. No. 25,890, filed Apr. 6, 1970.

After the required amount of ink has been fed into the well, each filling unit is then moved through stations D, E, F, and G. During this time, the ink in the well is absorbed by the filler through the inlet 11. The inking means 23 is located at one of the stations of the indexing table in relation to the position of the filler unloading means 63 at station H so that there is a sufficient period of time to permit all the ink in the well to be absorbed by the fillers before they reach the unloading station H.

At the unloading station H, the filler has absorbed the required amount of ink and the horizontal bore of the filling unit is horizontally aligned with a shell 35 of a marker pen, which shells are step linearly past the unloading station H. The unloading means 63 include a pusher rod 65, located above the index table which moves the now ink loaded filler from the filler unit into the shell of the marking pen. The pusher rod 65 is actuated by a pneumatic or hydraulic cylinder 69 and carried above the indexing table by a cantilevered arm 71, which arm extends over the table from its periphery and is connected to the base (not shown) of the indexing table. The rod 65 is sized and positioned to clear the stop 47 on the end of the filler unit as it enters the bore to push the filler out. The empty filler unit is then indexed back to the loading station B to receive another filler and the process is repeated.

The entire assembly for adding ink to the fillers and for inserting inked fillers into the shells of the marker pens is compact and capable of high-speed, continuous operation on an assembly line basis. The assembly is simple in operation and reliable in operation.

The number of the filler units spaced about the periphery of the indexing table can be varied as can be the amount of movement of each unit during each indexing step of the table. The more units positioned on the table, the more indexing steps required and the longer period of time available to absorb the ink. While only loading, filling and unloading stations have been shown, additional working stations can be used to perform other operations if required. For example, the filler can be partially inserted at station B and then accurately located in the bore in an immediately succeeding station.

Suitable means are provided to synchronize the timing of the movement of the indexing table and the marker pen shell conveyor as well as the operation of the filler delivery and insertion means, the ink feeding and the unloading means.

While a rotating, indexing table has been shown, other types of stepped conveyors can be used as well to move the filler units in steps while the fillers are loaded with ink prior to their insertion in the marker pens.

I claim:

1. A method of adding fluid to an absorbent, elongated filler of uniform cross section comprising the steps of;

circumferentially covering outer end portions of the filler and covering at least half the circumference of the remaining portion of the filler, leaving a central, uncovered surface section on the filler extending between the end portions;

supplying a predetermined amount of fluid to the uncovered, central surface section of the filler when the filler is positioned so its longitudinal axis extends horizontally and its uncovered section faces upwardly;

maintaining the filler covered until substantially all the fluid has been absorbed by the filler; and then uncovering the filler.

2. A method of adding fluid to an absorbent, elongated filler of uniform cross section comprising the steps of:

inserting the filler in a bore of a tubular section and centrally locating it in the bore with respect to an opening located in the top of tubular section intermediate the ends of the section;

supplying a predetermined amount of fluid to the top opening in the tubular section while the filler is maintained in the bore with its longitudinal axis in a horizontal plane;

maintaining the filler horizontally in the bore until all the fluid is absorbed by the filler; and then removing the filler from the tubular section.

3. A method as claimed in claim 1, wherein the predetermined amount of fluid supplied comprises between 83 percent and 87 percent of the amount of fluid capable of being absorbed by he filler.

4. A method as claimed in claim 2, wherein the predetermined amount of fluid is carried on the top of the tubular section in communication with the opening.

5. A method as claimed in claim 1, wherein the fluid added is ink.

6. A method of adding fluid to a plurality of cylindrical, absorbent fillers of uniform cross section comprising the steps of:

circumferentially covering outer end portions of the filler and covering at least half the circumference of the remaining portion of the filler so as to provide a central, uncovered surface section on the filler extending between the end portions;

moving each covered filler in sequence to an ink supply station;

supplying a predetermined amount of fluid to the uncovered surface section of each filler in sequence at the ink supply station, while the filler is maintained with its longitudinal axis in a horizontal plane and the uncovered surface section faces upwardly;

moving each filler away from the ink supply station while it is maintained horizontally, while substantially all the fluid is absorbed by the filler; and then uncovering each filler in sequence.

7. An apparatus for adding ink to an elongated, absorbent filler comprising:

a member having a bore for receiving an elongated, absorbent filler;

means supporting the member so the axis of the bore extends horizontally;

means above the bore for receiving a predetermined amount of fluid to be added to the elongated, absorbent filler; and an opening, centrally located with respect to the filler when the elongated, absorbent filler is within the bore, for connecting the fluid receiving means with an upper portion of the bore.

8. An apparatus as claimed in claim 7, wherein the member includes a tubular section mounted to extend horizontally on a base, said opening comprising a slot in the top of the tubular section extending parallel to the horizontal longitudinal axis of the section.

9. An apparatus as claimed in claim 8, wherein the tubular section has a length equal to the length of the elongated, absorbent filler, said slot centrally located with respect to the length of the tubular section.

10. An apparatus as claimed in claim 7, wherein said means for containing the fluid comprise walls attached to the top of the member and forming an open mouthed container surrounding the opening.

11. An apparatus for adding fluid to absorbent, elongated fillers comprising:

a plurality of filler-carrying members, each member having a bore for receiving an elongated, absorbent filler;

an opening in each member intersecting the bore and centrally located with respect to an elongated absorbent filler carried in the bore and means communicating with the opening for receiving a predetermined amount of fluid on the top of the member; and means for moving the filler-carrying members in sequence past a series of working stations, said members moved past at least some of the stations with the bore in each member extending horizontally and fluid receiving means, at the top of the member.

12. An apparatus as claimed in claim 11, wherein the series of working stations includes in sequence:

a. means for inserting an elongated, absorbent filler into the bore of each member;

b. means for supplying a predetermined amount of fluid to the fluid receiving means on each member; and c. means for removing the elongated, absorbent filler from each member when substantially all the fluid has been absorbed by each filler.

13. An apparatus as claimed in claim 12, wherein the means for moving the filler-carrying members past the work station comprise a horizontal turntable rotatable about a vertical axis, the members mounted about the periphery of the turntable.

* * * * *